Patented Mar. 5, 1946

2,395,825

UNITED STATES PATENT OFFICE 2,395,825

PREPARATION AND USE OF ANION MATERIAL

James C. Hesler, Chicago, Ill., assignor to Infilco Incorporated, a corporation of Delaware No Drawing. Application April 28, 1941, Serial No. 390,755

25 Claims. (Cl. 210—24)

The present invention relates to the production of an improved anion removal and exchange material and to its use in the treatment of acidic solutions. This application is a continuation in part of my copending application Serial No. 293,401, filed September 5, 1939.

A principal object of the invention is the provision of an improved anion removal or exchange material by the condensation of a carbamide compound or derivative having amino and imino groups with a carbonyl compound under such conditions as to provide a water-resistant product having pronounced capacity for removal and exchange of anions in aqueous solutions.

A further object of the invention is the formation of a water-insoluble guanidyl-aldehyde type resin having a high capacity for the removal of anions from an acidic solution, the resin having a sustained capacity for anion removal even after a large number of cycles of regeneration and exhaustion.

Still another object of the invention is the formation of a guanidyl-aldehyde type resin having a high capacity for anion removal from solutions by a process which includes initially reacting a guanidyl-type compound with an aldehyde in water solution under alkaline conditions and prolonged refluxing to form a relatively dilute polymethylol solution, adding substantial quantities of an acid such as hydrochloric, sulfuric, acetic or formic acid to render the solution strongly acid and to form a gel, aging the resulting gel, and drying the aged gel to produce a low density, transparent, vitreous water-insoluble resin having a relatively high anion removal property.

A still further object of the invention is effecting the guanidyl-carbonyl resin-forming reaction between a carbamide compound having amide and imide groups and an aldehyde or ketone under such conditions as to impart relatively low density, water-insolubility and high anion removal properties and preferably in the presence of a sufficient quantity of an insolubilizing agent such as urea to insure that the water resistance of the product is high.

These and other objects will be evident upon a consideration of the following description of the invention.

In the treatment of acidic solutions it has been found that certain bodies have the property of removing the free acids from the aqueous solution. It is not known if this acid removal is by exchange of a hydroxyl group in the bodies for the acid group in solution or if the removal is due to direct absorption of the entire molecule of free acid with the possible formation of an addition compound. Characteristically, these acid-removal or "anion exchange" bodies are regenerated with a dilute solution of an alkali, such as sodium hydroxide, sodium carbonate or bicarbonate, or ammonium hydroxide.

A material of this acid-removing type which has been proposed heretofore is m-phenylenediamine-formaldehyde resin. Notwithstanding a growing need for an acid-removal body, materials of this sort have not met with extended use. Principal reasons for the limited application of the previously known acid-removing bodies are their high cost, their low acid-removal capacity, the large amount of water required to wash out the alkali regenerant, and their decrease in capacity upon use for only a few hundred cycles.

The present invention is based upon the discovery of a different type of material than has been used for such purposes heretofore, which can have imparted to it a high acid-removal capacity, a high degree of water-insolubility and a relatively low density, and upon the development of a novel process for producing such materials for use in the treatment of acidic and other solutions.

Aqueous acidic solutions may be produced in a variety of processes. One process in which water solutions of a mineral acid are produced is in the treatment of water to be used for industrial purposes. The raw water may contain hardness-imparting constituents such as calcium and magnesium in the form of salts such as carbonates, bicarbonates, chlorides and sulfates. The raw water can be passed through a suitable zeolite having cation exchange properties to replace the cations of the salts. Where the cation exchange zeolite is a hydrogen exchange material the salts are converted into the corresponding free acids. The resulting water is aggressive and must be treated to remove the acid or to neutralize it before the water is suitable for use in industry. As suggested by Adams and Holmes (Journal of the Society of Chemical Industry, January 11, 1935) the water may be passed through a hydrogen exchange material to produce an aqueous solution of the acids corresponding to the salts in the water, and then the water can be passed through an acid adsorption body, such as the m-phenylenediamine-formaldehyde resin to which reference has been made. A formaldehyde-aromatic amine resin of this type will remove the acid, thereby completing the desalting of the water. The acid-removing capacity of these formaldehyde-aromatic amines characteristically is of the order of about 4500 grains (expressed in terms of calcium carbonate) per cubic foot when tested with a water having a total acidity of about 150 parts per million (also in terms of calcium carbonate), of which two-thirds is due to sulfuric acid and one-third to hydrochloric acid.

Other acidic solutions are encountered in various chemical processes in which neutralization or removal of the acid is desirable. Such aqueous acidic solutions can be treated in accordance with the present invention to remove the acid or to change the acid to a different acid.

The present invention is based upon my discovery of the acid-removal and anion exchange properties of a particular class of compounds, namely, guanidyl carbamides and substituted carbamides insolubilized by a resin-forming condensation of the amino portion of the guanidyl group with an aldehyde or ketone, and upon the development of a process by which the compound may be produced so as to have a relatively high activity, a low solubility, a low density, and a high porosity. Carbamide compounds are amides of carbonic acid and may be mono or di amides. Those of the guanidyl type having acid-removing or exchange properties when treated as described herein are imino-substituted amides. The substances which are of principal utility in the production of the improved acid-treating compounds are guanidine, dicyandiamide and their compounds and derivatives. The condensing agent preferably employed is formaldehyde.

The generally accepted structural formula for dicyandiamide is as follows:

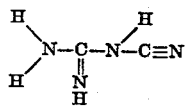

The generally accepted structural formula for guanidine is:

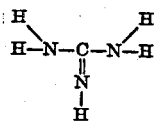

It will be noted that in each of these compounds there is a carbon atom to which are attached three nitrogen atoms. Two of the nitrogen atoms are attached to the carbon by a single bond forming the amino group, while the other nitrogen atom is connected to the carbon by a double bond forming the imino group. In the absence of an existing designation for this group,

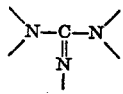

I have designated it for the purpose of this specification as the "guanidyl" group. In the various compounds of the guanidyl type such as dicyandiamide and guanidine, the two available valences of the nitrogen atoms attached to the carbon atom by a single bond may be assumed to be satisfied by alkyl or aryl or other groups, although at least one of the valences of each of the nitrogen atoms connected to the carbon atom by a single bond is satisfied by a hydrogen atom in order to provide a reaction mixture which readily will form a gel as an initial step of the process and subsequently a resin of the desired acid-removing activity and physical characteristics. The other groups may be a hydrogen atom or an organic radical of any suitable type, either alkyl or aromatic. For instance, the other groups may be hydrogen, or methyl groups or phenyl groups, or their homologs and derivatives.

In the conversion of the guanidyl carbamides to active acid-removal or anion exchange bodies, the amino portions of the guanidyl group are condensed with an insolubilizing agent, and the imino portion of the group lends anion-active characteristics thereto, that is, the property of removing acids from aqueous solution and replacement of one anion of a compound with another anion.

Among the carbamides possessing the reactive guanidyl group are dicyandiamide, guanidine, guanidine carbonate, guanidine sulfate, guanidine nitrate, substituted guanidines such as methyl guanidine, nitro guanidine and amino guanidine, and salts of substituted guanidines, biguanide, guanylurea, guanylthiourea, and amino guanidine. It is characteristic of these various compounds that in the presence of an acid in aqueous solution they will form the guanidinium ion (cf. H. J. Lucas, Organic Chemistry, page 302, American Book Company, New York, 1935). Possibly, it is this characteristic that lends the stability and reactivity to which the desired properties of the final product are due.

Heretofore, certain resins of guanidyl type compounds have been utilized for such purposes as molding composition, where the thermosetting characteristics of the material have been used to effect a permanent and dense form for the material upon the application of heat and susbtantial pressure. These molding compositions are of high density and impermeability and are generally unsuitable for the removal of acids from aqueous solutions.

The guanidyl type compounds may be condensed with a carbonyl compound such as formaldehyde, and preferably this condensation is effected simultaneously with the formaldehyde condensation of a further insolubilizing resin-forming compound such as urea. I have found that with some sacrifice of acid-removal capacity, my improved product may be rendered substantially more water-insoluble by combining the guanidyl carbamide-formaldehyde resin with a urea-formaldehyde resin. That is, there is mixed with the guanidyl carbamide another substance which also will react with the formaldehyde to form a mixed resin which has greater insolubility than the guanidyl carbamide resin alone. In this sense the other resin may be considered a filler. The two resins thus formed simultaneously in the same reaction mixture may or may not react together.

My improved type acid-removing materials are relatively inexpensive in preparation and are high in acid adsorption capacity per unit cycle. Additionally they have the capacity of retaining their acid-removing characteristics over a large number of cycles. For example, after 1,000 cycles of use and regeneration in the removal of sulfuric and hydrochloric acids from water previously subjected to hydrogen exchange treatment, the removal of sulfate and chloride ions is still complete, thereby making it possible to fulfill the usual guarantees of maximum permissible dissolved solids in the treated water over long periods of time. Even after this long continued use, the wash water requirement after regeneration and per cubic foot of resin is small and comparable with that of the material when new.

In the production of the improved acid-removal substance the guanidyl carbamide is mixed with formaldehyde and water. If the guanidyl substance itself does not have a basic reaction, there is added to the aqueous mixture a sufficient quantity of an alkaline substance such as sodium carbonate to give the reaction mixture definite alkalinity. Free guanidine is sufficiently basic itself to provide this alkalinity. If an acidic salt of guanidine is employed, then it is desirable to add sodium carbonate. For instance, where guanidine sulfate or nitrate is utilized, the sodium carbonate is added in sufficient quantities to provide a definite and important state of alkalinity in the reaction mixture. Where urea is to be utilized in the production of the compound, as in the preferred embodiment, the urea is added to this reaction mixture. The amount of the urea may vary substantially, but it is preferred to add a major quantity of the urea as compared with the quantity of the guanidine or the guanidine compound. The urea imparts water-insolubility to the resulting compound and the particular amount of the urea employed will depend upon such factors as the nature of the guanidyl carbamide used in the formation of the resin.

The amount of formaldehyde used likewise will depend upon such factors as the nature of the guanidyl carbamide. If too little formaldehyde is utilized, the product will not have the desired stability and water-insolubility. If too great a quantity of formaldehyde is employed, there results an economic waste as well as a decrease in the activity of the resin.

After forming the reaction mixture of the guanidyl carbamide, formaldehyde, water and urea, the mixture is subjected to refluxing for a period of time exceeding one hour in order to obtain the desired insolubility in the final composition. The heating of the reaction mixture under a reflux condenser returns to the mixture the water and some of the formaldehyde which are boiled off. Unless the heating is continued sufficiently, the desired water-insolubility of the compound is not obtained. Also, the heating is effected under the strongly alkaline conditions produced by the addition, if necessary, of an alkali.

The initial reaction in the formation of the guanidyl carbamide type resin is produced in this heating operation. This initial reaction is the formation of polymethylol urea and polymethylol guanidine. Apparently these compounds are separate. In practice it has been found desirable to continue the refluxing for at least about three hours.

After completion of the methylol formation the reaction mixture will consist of a water solution. The amount of water utilized is sufficient to insure retention of the reaction mixture in a thin fluid form after completion of the refluxing operation. If the alkali is not utilized in sufficient amount, the reaction mixture is apt to set up into a gel.

The methylol solution subsequently is converted to gel form, but in the production of an acid adsorption or removal resin in accordance with the present invention the density of the product seems to have a definite bearing upon its utility. Therefore, in the formation of the methylol solution the alkali and water are used in sufficient quantities to prevent the methylol solution from gelling or becoming a thick, viscous fluid. In general, it is satisfactory to operate with a solution, the concentration of which is between 4 and 20 per cent, based on the guanidyl group

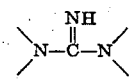

After completion of the methylol-forming reaction, the mixture is cooled and a sufficient quantity of an acid is added to the reaction mixture to cause the mixture to set up as a gel. The exact amount of acid employed will depend upon the alkalinity of the reaction mixture as well as upon its concentration. In general, the reaction mixture is made definitely acidic and the amount of acid employed will be sufficient to reduce the pH of the solution to below 2. More dilute reaction mixtures will require a greater quantity of acid to produce this pH and cause the reaction mixture to set up as a gel than in the case of more concentrated solutions. It is preferred to operate with a reaction mixture as dilute as practical, so long as the reaction mixture will set up as a definite gel upon the addition of the acid.

Free mineral acids such as hydrochloric and sulfuric acid may be utilized to cause the formation of the gel. Hydrochloric acid is preferred, since in the subsequent drying operations a volatile acid will avoid solubility of the resin in increasing concentration of acid. Organic acids, particularly those of relatively great acidic strength, likewise may be utilized. Formic acid is an example of organic acids which may be added at this point. In general, it is preferred to use an inorganic acid, by reason of the lower cost of these materials.

The acidification of the methylol reaction mixture and its setting up as a gel is followed by aging the gel. If the gel is not aged, or if it is aged too short a time, there is a tendency for the gel to become flabby and to fuse upon the subsequent drying operation to which it is subjected. If the gel is aged too long, the subsequent drying operation results in the formation of chalky product which is less desirable than a properly aged material.

The aging operation does not disturb the definite hydrogel condition of the acidified mixture. Some water may be lost from the gel by syneresis, but this quantity is not usually very great.

In general, the aging operation will extend for between 1 and 24 hours. For any particular compound it is possible to determine the proper age by noting the physical characteristics of samples of the product produced with periods of aging.

The properly aged gel is then comminuted to particles of one-quarter inch or less in diameter, and dried at a low initial temperature. In the absence of an oven in which the humidity can be controlled, it is preferable to start the drying at a temperature of 40° C. and to subsequently increase the temperature as the moisture is removed to 60–80° C. When control of the humidity is possible, the initial temperature may be higher without detriment to the porosity or density of the finished material by maintaining a high humidity in the dryer. If the gel is dried too fast or at too high an initial temperature in the absence of humidity control, a surface incrustation forms on the particles which prevents ready egress of water from the interior, thereby causing the particles to explode and to become powdery and of low mechanical resistance. In water they soften and become pasty. On the other hand, if the initial gel is aged too long or if the initial drying temperature is too low, the final resin consists of brittle, white and opaque masses resembling chalk. The particles float and become pasty in water, and exhibit poor capacity for acid removal.

The three factors—aging time, temperature control and humidity control—largely govern the properties of the final resin, and variation in one may be compensated by adjustments in the others to obtain uniform products of proper physical characteristics, porosity, density and capacity.

As the gel particles lose water and become firm, the temperature is slowly increased to 80–100° C. for periods of from five to ten hours. Following this treatment, the agglomerated particles which may have formed are disintegrated by rough crushing, and the resin thereafter subjected to the curing process wherein the final polymerization and consequent high degree of insolubility are effected.

After the removal of the water of hydration from the resin by drying the material may be heated to a relatively high temperature of the order of 150° C. to increase the water insolubility. Apparently this increase in the water insolubility of the material by the heating operation is produced by a further polymerization. The reactions occurring in the conversion of the methylol reaction mixture to the finally dried gel are not completely understood. The final result is a pronounced polymerization. It is possible that at least part of this polymerization occurs in the gel-forming reaction in which the acid is added to the methylol reaction mixture. Or, it is possible that this is merely a gelation accompanied by little, if any, polymerization and that the polymerization itself occurs upon the drying of the gel to a hard and irreversible particle form. At any rate, the final product is a transparent, vitreous resin of low density and relatively high porosity. This resin is cooled and the salts formed in the reaction are washed out with water. A water solution of an alkaline material may be employed to remove the residual acid, and thereafter the washing may be completed with water. Any free and bound acid is removed in this operation.

The salts present in the resin will depend upon the nature of the starting materials and the acid which has been employed in the gelation. Where the starting material is guanidine nitrate, for example, and sodium carbonate has been employed as the alkali in the initial mixture, there will be present in the final resin a substantial quantity of sodium nitrate. The subsequent water washing of the resin removes this salt and thereby leaves in the resin a corresponding porosity. Additional quantities of the sodium nitrate may be added to the reaction mixture to further increase the porosity of the final product. Other soluble compounds such as sulfates and chlorides likewise may be utilized for this purpose.

As before stated, any suitable guanidyl-type carbamide compound may be employed in the resin-forming reaction. A number of suitable guanidyl carbamides have been mentioned. Others are set forth in "Dicyandiamide and Guanidine Compounds," American Cyanamid & Chemical Corporation, New York.

The density of the final resin will depend upon the character of the materials used in its production. Where a guanidine compound is used and the ratio of guanidine to urea is of the order of 1 to 2 by weight, the final resin will weigh about 25 pounds or less per cubic foot, and its apparent porosity will be in excess of 25 per cent. The material characteristically has an acid adsorption, exchange or removal capacity of at least 5,000 grains per cubic foot (calculated as calcium carbonate). It is more usual that the resin will have an exchange capacity of more than 10,000 grains per cubic foot. It may be exhausted in acid-removal operations and subsequently regenerated for an almost unlimited number of times. Runs of 800 or 1,000 cycles do not materially diminish the capacity of the resin.

The regenerating operation may be carried out with any suitable dilute alkaline solution. A dilute solution of sodium hydroxide, sodium carbonate or the like may be used for this purpose. In carrying out the regenerating operation the alkaline solution is passed through a bed of the resin until the desired extent of regeneration is effected. Thereafter the alkaline solution is drained off and the material is washed with water until suitably free of alkali. Even after a large number of cycles of operation the resin may be regenerated and washed with substantially the same quantities of alkaline solution and water, respectively, as when the material initially is used.

In addition to its utility in directly removing acids from an aqueous solution, the guanidyl-type carbamide resin may be utilized to advantage in the change of one acid to another. For example, where an aqueous solution contains an acid such as sulfuric acid, it is possible to change the solution to a solution of hydrochloric acid by passing the sulfuric acid through the guanidyl resin charged with hydrochloric acid. Salts likewise may be converted by exchanging and thus replacing the negative ion.

Formaldehyde has been specified in the description of the formation of a guanidyl resin from guanidine, but other carbonyl compounds such as furfuraldehyde, acetaldehyde and acetone likewise may be utilized in the resin formation. These aldehydes and ketones are sometimes defined herein as "condensing agents having a carbonyl group." The term "carbonyl group" is used herein to define aldehydes and ketones to the exclusion of other compounds which may have oxygen attached to a carbon atom by a double bond, such as carboxylic acids, acid anhydrides, esters, and the like, which might be included in the term "carbonyl group." Also, other strength and insolubility-imparting materials than urea may be employed. Compounds such as thiourea, dicyandiamide and casein have been utilized for this purpose. These reactants are more than fillers for resins. They also are in themselves resin forming compounds when reacted with aldehydes and ketones and are useful because of the fact that their resins are more insoluble than those of guanidine alone.

The following are examples of the production of satisfactory specific guanidyl type resins:

*Example 1*

45 grams of guanidine nitrate (0.37 mole free guanidine) were boiled under reflux for 3 hours with 100 grams of 37 per cent formalin solution and 12 grams powdered sodium carbonate. At the expiration of the alkaline refluxing period the solution was clear and slightly yellow. Upon acidification with 10 cc. of 38 per cent hydrochloric acid and upon cooling, the solution was allowed to stand until it thickened and set in the form of a white, opaque gel which exhibited a certain amount of syneresis upon aging. The gel was comminuted and dried as described in Example 2, at first under a relatively low temperature below the boiling point of water, to yield 60 grams of a glass-like transparent solid. When tested under laboratory conditions with hydrochloric acid, its acid removal capacity was found to be 22,000 grains (on the basis of calcium carbonate) per cubic foot.

*Example 2*

100 grams of urea (1.66 moles), 104 grams of guanidine nitrate (0.85 mole free guanidine) and 26 grams of sodium carbonate were refluxed in 485 grams of formalin (6.0 moles) and 250 grams of water for 4 hours. The hot, slightly yellow and clear solution was cooled to 85–90° C. and with this solution was mixed 25 ml. of 38 per cent HCl. The solution was allowed to cool, and in due course set up as a white, opaque gel which was relatively stiff. The gel was aged for 3–4 hours and then comminuted to a particle size of about ¼" or less. The comminuted particles were placed on a tray in a forced-draft dryer. The first 2 hours of the drying operation was at a relatively low temperature of between 40° and 50° C. and then the temperature was cautiously raised over a 6 hour period to a maximum of 80–100° C. The rate of drying was such as to remove the water of hydration without fusion of the particles or destruction of their porous structure.

The drying operation was followed by a further comminution to a particle size of 10–60 mesh and the particles were subjected to a temperature of 100° C. to 150° C. to effect complete polymerization and further water insolubility and thereafter the product was cooled and washed.

The yield was 275 grams of washed, salt-free, acid-free resin of a white color and vitreous nature having an apparent density of 25 lbs. per cubic foot and an apparent porosity of 30 per cent.

The acid removal capacity of the material was about 13,000 grains per cubic foot, calculated as calcium carbonate.

Since acid adsorption or removal materials of this type must be used for a large number of cycles, the matter of water solubility is of importance. The various guanidyl carbamide resins will vary to some extent in their water solubility. In actual use any slight loss which may be occasioned by the washing away of the guanidyl resin may be compensated for by the mere addition of a make-up quantity. By properly controlling the operating conditions used in the formation of the resins the water-solubility may be decreased perceptibly and the density of the material may be held to the proper maximum. Where the process has been carried out properly with a guanidine-urea-formaldehyde resin, the resin may be employed for a thousand cycles of operation with the loss of as little as 10 per cent of the original quantity.

The secondary substance condensed with the guanidyl carbamide can vary widely in its composition, since its function is one of insolubilization. Urea itself is a carbamide, thereby closely resembling guanidine, for example, but urea is not a guanidyl carbamide. Urea resin does constitute a satisfactory filler, even though its mixture with the guanidyl carbamide resin is of some sacrifice per pound of acid activity.

In producing the anion-active material with or without the insolubilizing filler, care is taken to provide a product of low apparent density and high apparent porosity. Substantial anion-activity is usually obtained when the percentage of apparent porosity is a greater figure than the apparent bulk density of the product in pounds per cubic foot, and in any case it is desired that the porosity be not less than 25 per cent.

As used herein and in the claims, the following terms are given their usual meaning: "apparent density" is synonymous with "bulk density" and is commonly used to designate the weight of a given volume of granular, fragmented, or powdered material. It is distinguished from the true density of the substance itself (i. e. of a single particle of the substance) since apparent density is less than true density by reason of the void spaces between the particles of the substance when in bulk volume. "Apparent porosity" is the ratio of the volume of internal free space (i. e. pore space) inside a particle to the entire volume of the particle, expressed in percentage. "Acid-active factor" is the activity for removing acids. "Anion-active factor" is the activity for removing or exchanging anions.

The term "insoluble" used in connection with the resin described herein, and in the claims which follow, is used to indicate a material which is practically insoluble in water, dilute acid or dilute alkali. As an example of what is meant by the term insoluble, materials which withstand runs of 800 or 1000 cycles of exhaustion and regeneration without materially diminishing their volume are such as would be included herein. The term "substantial amount" used in the specification and claims in referring to the proportion of guanidyl compounds in the resin, refers to the amount of free guanidine in the starting material compared with other reactants which may be condensed with an aldehyde or ketone to form a resin. This term is therefore used to designate, for example, the proportionate amount of free guanidine in the guanidyl compound as compared to the amount of urea or other such material, and in this connection it may be considered as requiring at least 1 mole of free guanidine to 4 moles of urea or other material, exclusive of the aldehyde or ketone with which such groups react.

The various changes which may be made in the process and product without departing from the scope of the invention are intended to be included in the appended claims.

I claim:

1. The process for removing salts from water which comprises subjecting the water to treatment first with a hydrogen exchange body and subsequently with an anion removal body composed of an insoluble resin containing a guanidyl group condensed with an aldehyde.

2. The process for removing acids from aqueous solution which comprises contacting the solution with an insoluble resinous product containing a substantial amount of a guanidyl group condensed with a condensing agent taken from the group consisting of aldehydes and ketones.

3. The process for removing free acids from aqueous solutions which comprises contacting the solution with an insoluble resinous product containing a substantial amount of a guanidine compound having a guanidyl group condensed with an aldehyde.

4. The process for removing free acids from aqueous solution which comprises contacting the solution with an insoluble resinous product containing a substantial amount of a dicyandiamide compound having a guanidyl group condensed with an aldehyde.

5. The process for removing free acids from aqueous solution which comprises contacting the solution with an insoluble combined resinous product containing not more than 4 moles of a urea-formaldehyde condensation product and 1 mole of a compound having a guanidyl group condensed with formaldehyde.

6. The process of removing acids from aqueous solutions which comprises contacting the solution with a water resistant resinous material containing a substantial amount of a compound formed by the condensation of the guanidyl group of a carbamide with a condensing agent taken from the group consisting of aldehydes and ketones, and having an apparent porosity of at least about 25 per cent.

7. An anion-active material comprising a guanidyl carbamide compound having an amino portion condensed with a condensing agent taken from the group consisting of aldehydes and ketones and an imino portion having acid active characteristics, said compound being hard, granular, water resistant, having an apparent porosity of at least about 25 per cent, and having an acid-active factor of more than 5000 grains per cubic foot.

8. An anion-active material comprising a guanidyl carbamide compound having an amino portion condensed with an aldehyde and an imino portion having acid-active characteristics, and a urea-aldehyde resin combined therewith in the form of granules, said granules being water resistant, having an anion-active factor of more than 5000 grains per cubic foot, and having an apparent porosity of at least 25 per cent.

9. An anion-active material comprising a combined resin having as a minor constituent a guanidine compound having its guanidyl portion condensed with formaldehyde and having a urea-formaldehyde resin as a major constituent, said combined resin being of granular form and water resistant, the percentage of apparent porosity of said combined resin being a larger figure than the apparent density of said combined resin expressed in pounds per cubic foot, and the anion-active characteristics of said combined resin being in excess of 5000 grains per cubic foot.

10. The process of producing an anion-active resin which comprises condensing an alkaline solution of a carbamide having a guanidyl group with a condensing agent taken from the group consisting of aldehydes and ketones to produce a methylol solution, acidifying the solution to form a gel, aging the gel for a period of from 1 to 24 hours, comminuting the gel, drying the comminuted gel at a temperature below 100° C., and heating the gel to a temperature above 100° C.

11. The process of producing an anion-active resin which comprises condensing a guanidyl carbamide and a water-resisting resin-forming compound taken from the group consisting of urea, thio-urea and dicyandiamide simultaneously in an alkaline aqueous solution with an aldehyde, acidifying the resulting combined resin to form a gel, aging the gel and drying the aged gel under controlled conditions of humidity and temperature to produce hard irreversible particles having an apparent porosity of at least 25 per cent.

12. The process of producing an anion-active resin which comprises condensing a guanidyl carbamide and urea with formaldehyde in an alkaline aqueous solution, acidifying the reaction mixture to form a gel, aging the gel for a period of from 1 to 24 hours, and drying the gel sufficiently slowly to form hard irreversible particles having an apparent porosity of at least 25 per cent and an anion-active characteristic in excess of 5000 grains per cubic foot.

13. The process of producing an anion-active resin which comprises condensing a dicyandiamide compound with formaldehyde in an aqueous solution, acidifying said solution to form a gel, and drying the gel sufficiently slowly to provide hard irreversible particles having an apparent porosity of at least 25 per cent and an anion-active characteristic of more than 5000 grains per cubic foot.

14. The process of producing an anion-active resin which comprises condensing an alkaline aqueous solution of a guanidine compound with formaldehyde and simultaneously producing an in situ condensation of a water resistant resin-forming compound taken from the group consisting of urea, thio-urea, and dicyandiamide with formaldehyde, acidifying the reaction mixture to form a gel, aging the gel, and drying the gel at a temperature below about 100° C. to form hard irreversible particles having an anion-active characteristic of more than 5000 grains per cubic foot.

15. The process of producing an anion-active resin which comprises condensing an alkaline aqueous solution of a guanidine carbamide with a condensing agent taken from the group consisting of aldehydes and ketones, acidifying the reaction mixture to form a gel, aging the gel, initially drying the gel at a relatively low temperature, further drying the gel at a higher temperature below 100° C., and heating the dried gel to above 100° C.

16. The process of producing an anion-active resin which comprises boiling a relatively dilute alkaline aqueous solution containing a minor quantity of a guanidine salt and a major quantity of a water-resistant resin-forming material taken from the group consisting of urea, thio-urea, and dicyandiamide with an aldehyde under reflux to form a methylol solution, acidifying the methylol solution to form a gel, aging the gel for a period of from 1 to 24 hours, comminuting the gel, drying the comminuted gel at a relatively low temperature, further drying the gel at a higher temperature below 100° C., and heating the dried gel to above 100° C.

17. The process of producing an anion exchange resin which comprises refluxing a guanidyl carbamide with a condensing agent taken from the group consisting of aldehydes and ketones for a period of time sufficient to substantially complete the initial condensation reaction, acidifying the solution to form a gel, aging the gel, drying the gel below 100° C., and finally raising the temperature of the gel to above 100° C.

18. The process of producing an anion active resin which comprises refluxing a dilute alkaline solution of a guanidyl carbamide with a condensing agent taken from the group consisting of aldehydes and ketones for a period of time of the order of about three hours to form a methylol compound, acidifying the methylol compound to form a gel, aging the gel for a period of from 1 to 24 hours, drying said aged gel below 100° C. and finally heating the dried gel to above 100° C.

19. The process of producing an anion-active resin which comprises boiling a relatively dilute aqueous alkaline solution of a minor quantity of a guanidyl carbamide and a major quantity of urea with formaldehyde under reflux for at least about 3 hours to produce a fluid methylol solution, acidifying the methylol solution sufficiently to form a gel, aging the gel for a period of time between 1 and 24 hours, comminuting the aged gel to particles of a size not larger than about one-quarter inch, drying the comminuted gel at an initially low temperature below 80° C. to increase the firmness of the particles, varying the temperature of the particles to between 80° C. and 100° C. to remove further quantities of water of hydration from the gel particles, thereby effecting polymerization and converting said particles into hard and irreversible particle form, breaking said particles into smaller particle form, heating said particles to a temperature between 100° C. and 150° C., and cooling and washing said particles.

20. A cyclic process for removing acid constituents from a fluid which comprises treating the fluid with an insoluble resinous product containing a guanidyl group condensed with an aldehyde, regenerating said resinous product by contacting it with a solution of an alkali, and subsequently treating a fresh portion of the fluid with said resinous product.

21. A process for removing acid from aqueous solution which comprises contacting the solution with an insoluble resinous product formed by condensing a condensing agent taken from the group consisting of aldehydes and ketones with a guanidyl group.

22. A process for removing free acid from aqueous solution which comprises treating the solution with the resinous product formed by condensing formaldehyde with the guanidyl group of a guanidine compound and urea.

23. A process of removing anions from fluid media which comprises contacting particles of an anion active material, which is substantially insoluble in said media and a major proportion of which material is an anion active component composed of a guanyl urea-aldehyde condensation product, with a fluid medium containing anions and separating said medium from said material.

24. A process of removing anions from fluid media which comprises contacting particles of an anion active material, which is substantially insoluble in said media and a major proportion of which material is an anion active component composed of a guanyl urea-formaldehyde condensation product having anion active properties, with a fluid medium containing anions and separating said medium from said material.

25. A process of removing anions from aqueous media which comprises contacting particles of an anion active material, which is substantially insoluble in said media and a major proportion of which material is an anion active component composed of a guanyl urea-aldehyde condensation product having anion active properties, with a fluid medium containing anions and separating said medium from said material.

JAMES C. HESLER.